US009688336B2

(12) United States Patent
Lafleur (10) Patent No.: US 9,688,336 B2
(45) Date of Patent: Jun. 27, 2017

(54) PROTECTIVE DETACHABLE CABIN FOR ELECTRIC SCOOTER

(71) Applicant: Louisa Marie Lafleur, Sherbrooke (CA)

(72) Inventor: Louisa Marie Lafleur, Sherbrooke (CA)

(*) Notice: Subject to any disclaimer, the term of this patent is extended or adjusted under 35 U.S.C. 154(b) by 124 days.

(21) Appl. No.: 14/463,680

(22) Filed: Aug. 20, 2014

(65) Prior Publication Data

US 2016/0052582 A1 Feb. 25, 2016

Related U.S. Application Data

(63) Continuation of application No. PCT/CA2013/000141, filed on Feb. 19, 2013.

(30) Foreign Application Priority Data

Feb. 22, 2012 (CA) ........................ 2769584

(51) Int. Cl.
*B62J 17/00* (2006.01)
*B60R 21/13* (2006.01)
(Continued)

(52) U.S. Cl.
CPC ............... *B62J 17/00* (2013.01); *B60R 21/13* (2013.01); *B62D 31/003* (2013.01); *B60R 2021/0088* (2013.01); *B62J 2017/086* (2013.01)

(58) Field of Classification Search
CPC .... B62D 21/183; B62D 25/16; B62D 31/003; B62J 17/00; B62J 2017/086; B60R 21/13; B60R 2021/0088
See application file for complete search history.

(56) References Cited

U.S. PATENT DOCUMENTS 4,336,964 A * 6/1982 Pivar ........................ 296/77.1
4,639,034 A * 1/1987 Amos ...................... 296/100.18
(Continued)

FOREIGN PATENT DOCUMENTS

FR         2806367 A1    9/2001
JP      2008094293 A     4/2008
WO  WO 2011/091979 A1   8/2011

OTHER PUBLICATIONS

International Search Report dated Jul. 12, 2013 in related International Application No. PCT/CA2013/000141.
(Continued)

*Primary Examiner* — Paul N Dickson
*Assistant Examiner* — Timothy Wilhelm
(74) *Attorney, Agent, or Firm* — Eric L. Lane; Green Patent Law (57) ABSTRACT

A cabin specifically designed for people disabled with different dexterities: The cabin has several universal manufacturing systems comprising a chassis consisting of pipes being covered by a system of individual panels of transparent flexible vinyl, the panels being individually attached around the pipes of the frame with different and distinct fastening systems, and the system has two sliding door panels of transparent flexible vinyl comprising a magnet closure system, two different systems of distinct elements of the scooter having welded perforated adapters on top of their elements fixed to the scooter, two different systems of narrow slats installed on scooter floor, two different systems forming the rear lower part of the scooter, and the system of supported pipes of chassis is fixed to the roof system, the removable panels from the supporter pipes of chassis being system for converting cabin roof to canopy.

19 Claims, 7 Drawing Sheets

(51) Int. Cl.
*B62D 31/00* (2006.01)
*B62J 17/08* (2006.01)
*B60R 21/00* (2006.01)

(56) References Cited

U.S. PATENT DOCUMENTS

| | | | | |
|---|---|---|---|---|
| 5,458,390 | A * | 10/1995 | Gilbert | 296/78.1 |
| 5,791,718 | A * | 8/1998 | Boutin | B62J 17/00 |
| | | | | 296/136.01 |
| 6,279,986 | B1 * | 8/2001 | Hinsperger | B62D 33/0625 |
| | | | | 296/102 |
| 6,402,220 | B2 * | 6/2002 | Allen | 296/77.1 |
| 6,543,830 | B1 * | 4/2003 | Stuck | B60J 7/10 |
| | | | | 296/77.1 |
| 7,854,463 | B1 * | 12/2010 | Neumann | 296/83 |
| 8,087,687 | B2 | 1/2012 | Murdock | |
| 2002/0167190 | A1 * | 11/2002 | McElwee et al. | 296/77.1 |
| 2004/0046412 | A1 * | 3/2004 | Moen et al. | 296/100.02 |
| 2006/0290163 | A1 * | 12/2006 | Showalter et al. | 296/102 |

OTHER PUBLICATIONS

Written Opinion dated Jul. 12, 2013 in related International Application No. PCT/CA2013/000141.
International Preliminary Report on Patentability dated Aug. 26, 2014 n related International Application No. PCT/CA2013/000141.

* cited by examiner

PROTECTIVE DETACHABLE CABIN FOR ELECTRIC SCOOTER

FIELD OF THE INVENTION

The subject invention relates generally to a protective detachable cabin especially for electric scooter: More particularly, the subject invention relates to a system of individual detachable protective flexible and transparent cover vinyl panel from the system of pipe of chassis of the cabin, a system of detachable rigid pipe of chassis of the cabin being detachable by means of system of detachable locking system from the system of element being fixed permanently to the scooter.

More particularly, including the two system of element may be fixed permanently to scooter for the need of disable having different dexterity of people.

More particularly, the rigid system pipe of chassis of the cabin may be detachable from the said two system of element being fixed to scooter for the need of separate elements on scooter to be transported in a vehicle when traveling.

BACKGROUND prior No. U.S. Pat. No. 5,791,718 A filed Aug. 11, 1998, WO 2011/091979A1 filed Aug. 4, 2011, CA, 702.095 A1 filed Nov. 4, 2011.

Scooter Cabins being designed especially for disabled people with different dexterities.

These cabins aren't built for the vast majority of users who receive a prescription requiring a rental scooter because the alteration isn't acceptable to the scooter.

The scooter user must check weather predictions to plan their daily activity, in case of rain, some use a raincoat and/or umbrella.

These vehicles are used most of the time in summer, winter said vehicles are stored or used very rarely.

Most rigid and flexible cabins are permanently attached to the scooter by professionals.

The other cabins cannot separate elements on scooter to transport in a vehicle when traveling.

The flexible covering cabins made of almost one piece often have a U-shape to attach to a windshield with Velcro or other fasteners.

The so-called cabins have doors that close with zippers or other rigid frame system which are not necessarily practical for people with different dexterities.

Currently there are cabin of all kinds for these vehicles, but they generally lack flexibility or are completely inappropriate, for example for grocery shopping customers.

Detachable roof canopy whose structures are fixed behind the seat of the scooter tend to lift up in high winds. Many prefer not to use such canopies.

These vehicles are used only partially, so it is desirable to ensure that these vehicles are suitable for any daily indoor or outdoor activities without worry and in and enjoyable way for the user of the targeted clientele.

SUMMARY OF THE INVENTION

The present invention relates to a detachable protective cabin for electric scooter can be used daily in a pleasant and worry-free way regardless of the season.

This cabin is primarily designed for users with reduced mobility and having different dexterities but especially for the user who receives a prescription requiring renting a scooter.

The invention is characterized by the use of various universal manufacturing systems.

In exemplary embodiments, the system chassis cabin comprises perforated pipes at the base positioning on the perforated adapters, the cabin with its own system of detachable locking.

In exemplary embodiments, the perforated adapters are positioned into supporting pipes of chassis of the cabin with their own detachable locking system for liberating elements pipes and slats attached to the scooter.

One of the embodiments of the invention is characterized in that two different systems of elements with a perforated adapter welded, said elements being fixed by system of bolt to the scooter and said adapter welded on support elements being fixed by a detachable locking system on the perforated base of supporting pipes chassis of cabin.

One of the embodiments of the invention is characterized in that the first system elements attached to the scooter includes: perforated adapters welded to the front bumper, the narrow side slats on each side of the edge of the floor and luggage rack under seat of rear scooter, and said supported elements being fixed to the base of perforated supporting pipes of chassis of the cabin by a detachable locking system.

In one of the embodiments of the invention, the second elements attached to the scooter system is characterized:

in that system padded collars with welded perforated adapter are attached to the front and rear bumper and are attached to the perforated base of supporting pipes chassis system of cabin, said supporting pipes at the front and rear part of the chassis of the cabin;

in that the second element attached by means of system of bolt to scooter system comprises: a system of series of two padded narrow slats placed on front and rear floor and two narrow slats placed under front and rear floor of scooter being fixed to the narrow padded lateral side slats being place on the edge of each side of the floor. The ends of said slats have a welded perforated angle and a welded perforated adapter. Said second system of element is attached by means of system of bolt to scooter and the second system of element is attached to the perforated base of supporting pipes chassis of cabin by locking system, in that system padded collars with perforated adapter are attached to the rear bumper and said collars are attached to the supporting rear chassis pipe which being forms by; the lower rear portion of the cabin, and of the upper part the rear chassis of the cabin, said upper part which being formed by the extension of the roof, the said pipes which form the lower part of the rear of the cabin leaves the possibility to turn the seat.

One of the embodiments of the invention is characterized in that the junction system joint of the supporting pipe system of the chassis is linked the roof of the cab chassis.

One of the embodiments of the invention is characterized in that said system comprises individual panels of transparent flexible vinyl system 20 gauge UV, FR, CC pipes that attach to the chassis of the cabin by various fastening systems. In exemplary embodiments, the fastening system consists of different series of fasteners: said attachment system being selected from the group consisting of a snap system, a system section of zipper, a system section of Velcro, a series of small turn twist locks. The vinyl panel system is linked around pipes, being fixed by means of snap system, said series of fasteners used to partially detach the entire vinyl panel, said system being required for customers with different dexterities.

One of the embodiments of the invention is characterized in that the door system is composed of flexible transparent vinyl having a closure composed of magnets.

One of the embodiments of the invention is characterized in that the panel of flexible transparent vinyl covers the chassis of cabin. The detachable vinyl panel roof can be used as a canopy by detaching all vinyl panels from the supporting pipe of roof, said roof having the sunscreen/heat shield full length summer and winter half-length sliding.

BRIEF DESCRIPTION OF THE DRAWINGS

Brief Description in connection with the accompanying drawings wherein all references will be detailed in (Detailed Description).

PAGE 3: The drawings represent all component references of figures of the first element system of pipes FIG. 3, FIG. 4, FIG. 5 being fixed to scooter being attachable from the detachable supporting pipe system of roof chassis of the cabin by means being detachable from locking system.

PAGE 4: The drawings represent all component references of FIG. 6, FIG. 7.

FIG. 8, FIG. 9, and FIG. 10, in that the second elements system of pipes is fixed to the scooter, by means being of attachable supporting pipe system of the chassis cabin and being detachable by the locking system. The seat of this system is turning for different mobility people.

DETAILED DESCRIPTION

Protective Detachable Cabin for Electric Scooter

Figure 2:
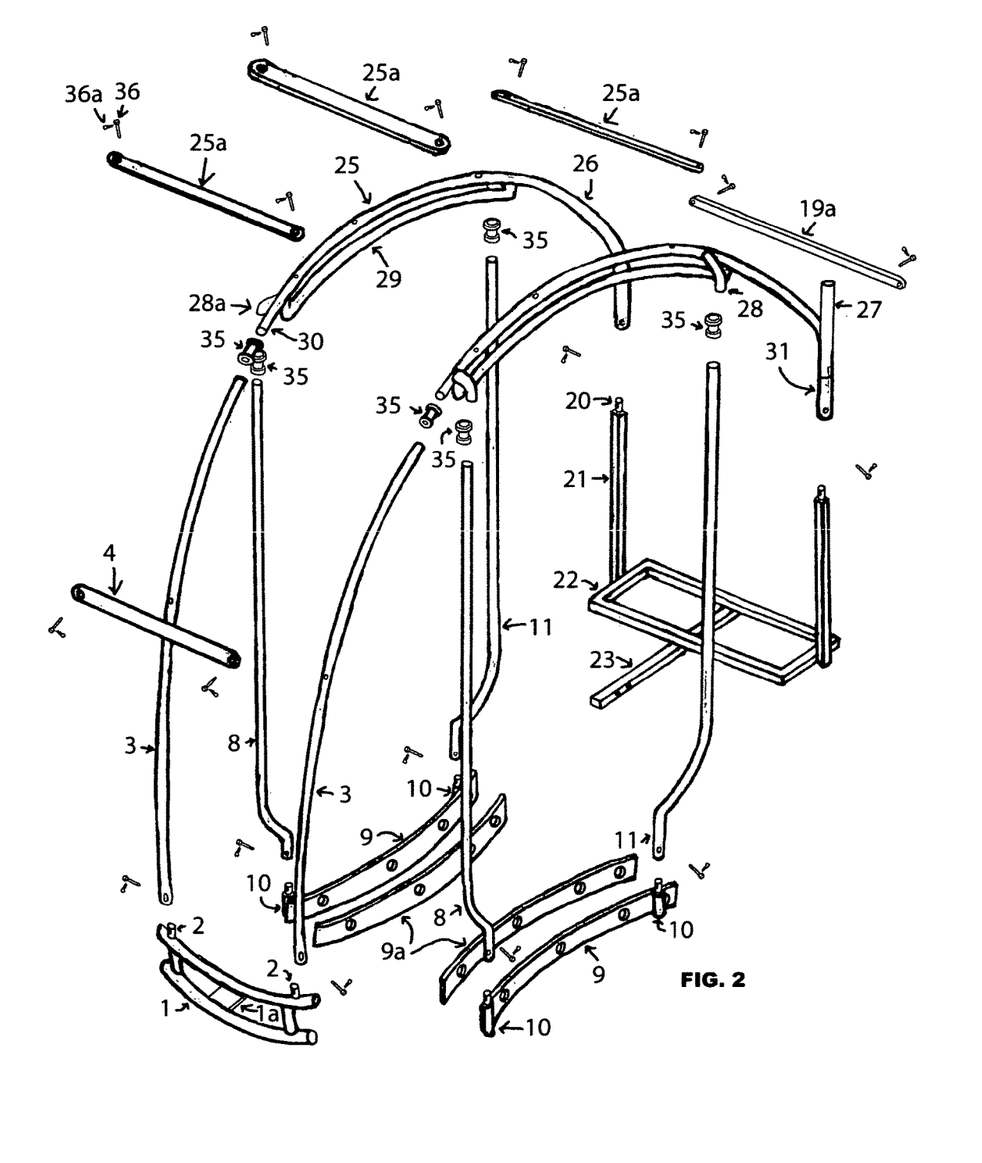
FIG. 2: The drawings represent all component references in detachable pipe chassis of cabin system on page 2; including the first system of elements being detachable from the supporting pipe system of the roof chassis and the said first system of elements to be fixed to the (scooter not shown) are FIG. 3, FIG. 4, and FIG. 5 they are showing on page 3. Said first system of element being selected from the two consisting of elements systems fixed to the scooter. In that second system of elements being fixed to scooter are FIG. 6, FIG. 7, FIG. 8, FIG. 9, FIG. 10, they are showing on page 4. Said second system of elements are attachable to the said supporting pipe system of the roof chassis, being detachable from locking system.

Detailed Description in connection with the accompanying drawings wherein all references will be detailed in FIG. 2 and considered identical on both side of cabin.

Figure 1:
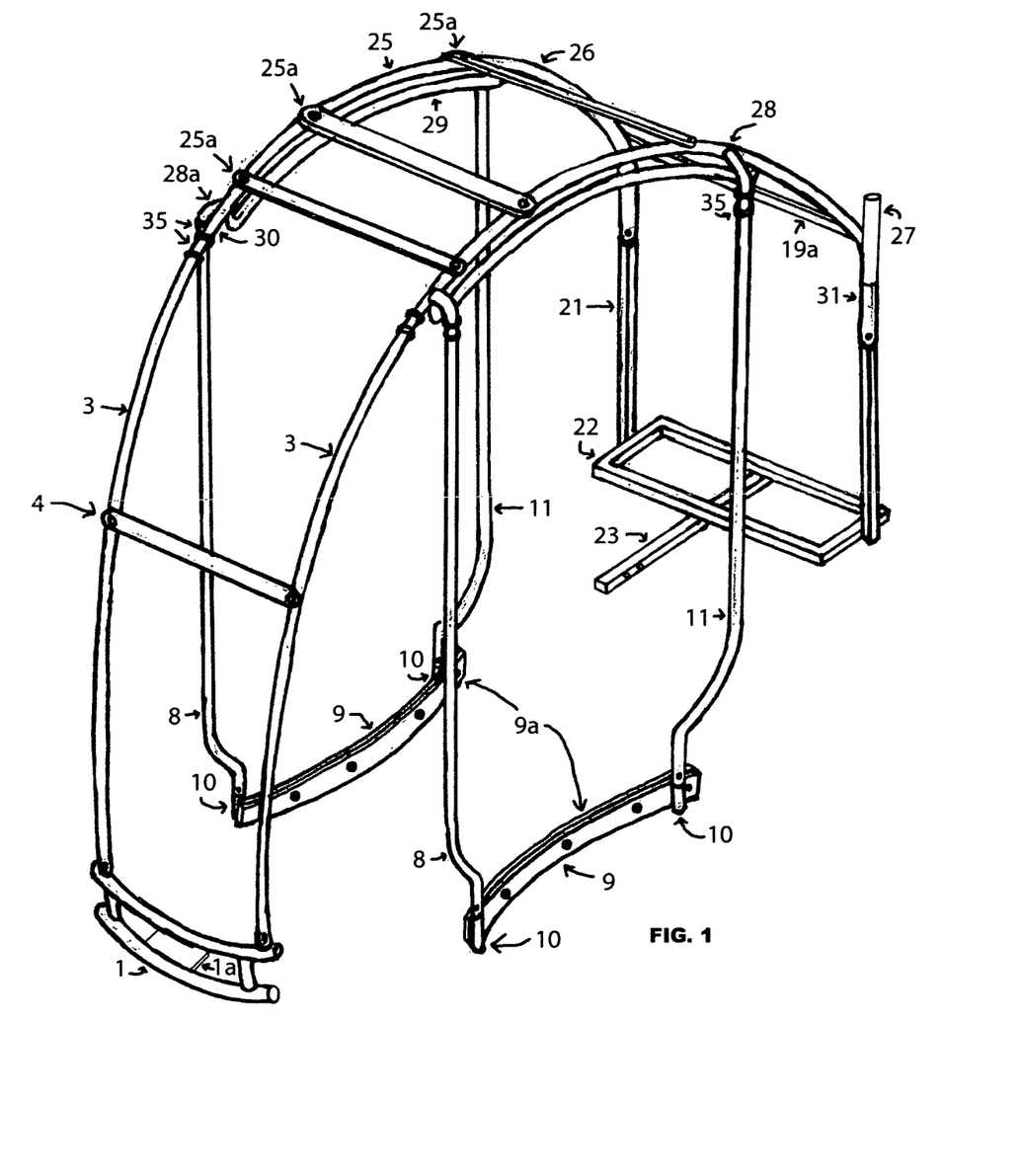
FIG. 1: The drawings represent all component references of the whole pipe system of chassis of the cabin on page 1, including the first system of elements being fixed to supporting pipe system of the roof of cabin chassis; the said first system of elements to be fixed to the (scooter not shown on the drawings) are FIG. 3, FIG. 4, and FIG. 5 showing on page 3, in that said first system of elements being selected from the two consisting systems of elements to be fixed to scooter not shown. The second system of elements to be fixed to scooter not shown, are FIG. 6, FIG. 7, FIG. 8, FIG. 9 and FIG. 10 showing on page 4, in that said first system and second system of elements are attachable to the supporting pipe system of the roof chassis which is detachable from locking system.

FIG. 1: the drawing represents the whole pipe system of chassis of the cabin including the first system of elements being attachable to the whole pipe system of the chassis and being detachable by the system of detachable locking from the system of supporting pipes of the roof chassis: In that said first system the elements are selected from the two consisting systems of elements to be fixed to scooter: the roof of the chassis of the cabin of the pipe system and extension are arched and identical on each side. The roof is formed of pipes of various piping portions comprising a system of supporter pipes of the system of sliding doors suspended by detachable straps, said pipes having an angle at their ends being welded pipes under the roof and follow the arc of the roof of said pipes. The connector pipe system is welded to each outer side of the roof pipe, said welded pipes being aligned above door pipe supporters, said curved form of the connector pipe system being oriented toward each side of floor to supporting pipe system of the roof being fixed by means of junction system to the roof of the cabin. The front and rear ends of the pipes of the roof chassis are fixed by means of junction system to the front and rear pipes supporting the roof chassis, said rear roof pipes having a flag holder pipes-welded at their end.

In exemplary embodiments, the two distinct systems of elements are fixed to the electric scooter, in that this conception of invention of cabin being for the need of the people having different kinds of dexterity and mobility.

Figures 3, 4:
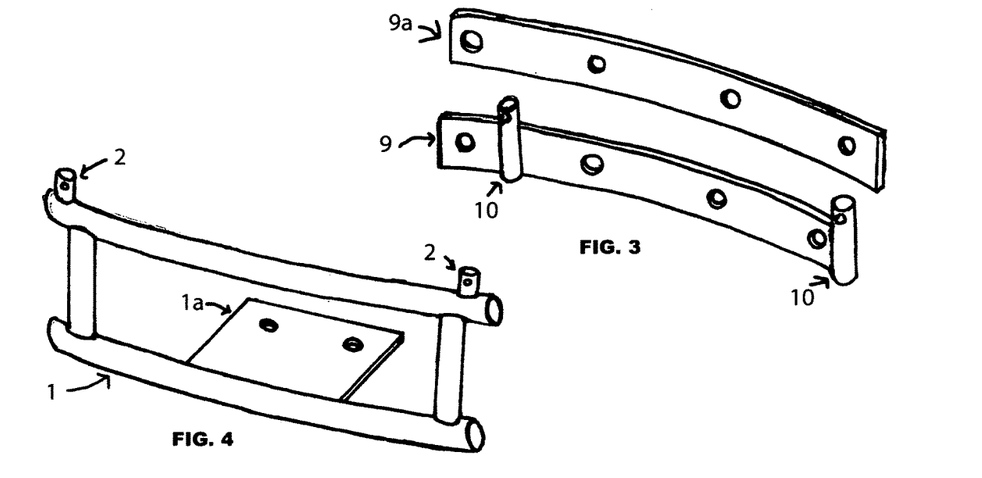
FIG. 3: The drawings represent all component references of system of the lateral slats to be permanently fixed on the edge of the floor on either side of (scooter not shown) by means being detachable from the supporting pipe system of chassis of the cabin.
FIG. 4: The drawings represent all component references of a system of bumper to be permanently fixed under the front of scooter.
Figure 5:
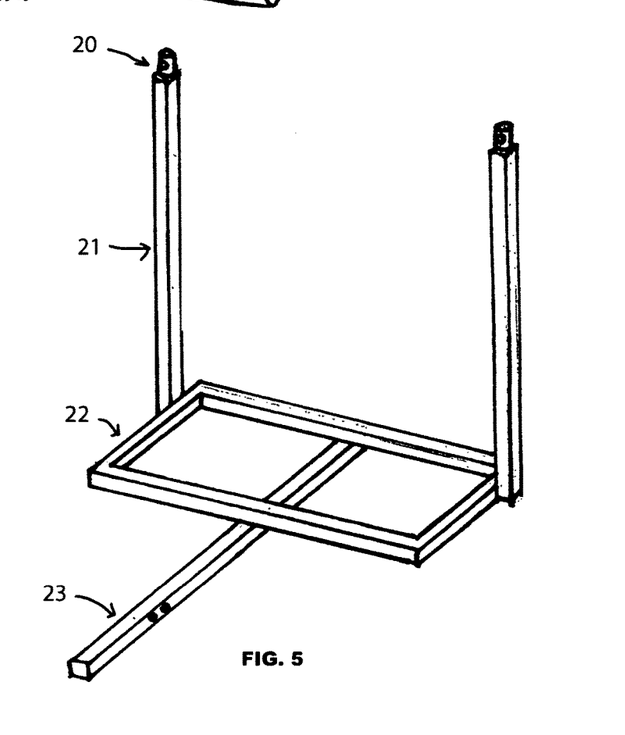
FIG. 5: The drawings represent all component references of a detachable luggage rack mounted under the back seat of scooter.

In exemplary embodiments, the first system of distinct elements is fixed to scooter, in that said first system of elements being selected from the two consisting systems of elements to be fixed to scooter comprised of: FIG. 3, FIG. 4, FIG. 5, in that said first system of elements being attachable to the supporting pipe system of roof chassis and being detachable from locking system.

In exemplary embodiments, the second system of distinct elements is fixed to scooter and may be attachable to the whole pipe system of chassis comprised of: FIG. 6, FIG. 7, FIG. 8, FIG. 9, FIG. 10 and they are showing on page 4, in that said second system of elements being attachable to the supporting pipe system of roof chassis and being detachable from locking system. The seat of the second system is turning for the different needs of disabled people.

Figure 20:
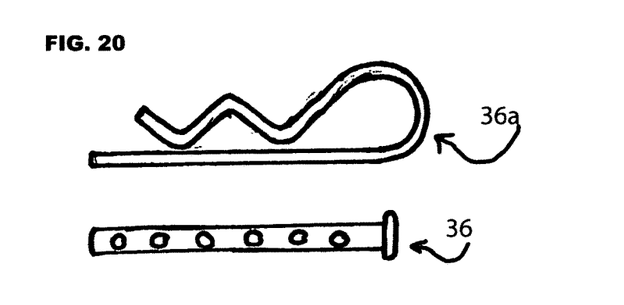
FIG. 20: The drawings represent all component references of the locking system being composed of a rod shoulder and a clamp.

FIG. 2: The universal system of pipes of chassis of the cabin is comprised of: a system of narrow transversal slats perforated at their end, said narrow transversal slats being fixed on the universal system of chassis, on top of perforated pipes (25*a*,25*a*,25*a*) of chassis. The narrow slat (4) on perforated supporting front pipes (3) of chassis and the said narrow slat (19*a*) and on the perforated pipes extension (26) of the roof (25) system form the upper part of rear pipes of chassis, and the lower part of rear chassis of cabin is formed by a system of luggage pipes rack FIG. 5 (21) being fixed by means of detachable locking system FIG. 20 (36, 36*a*). The system of front supporting pipes (3) of the roof chassis and the system of lateral supporting pipes (8,11) of the roof chassis system are linked to the system of the roof pipes of chassis (25) being fixed by means junction system FIG. 19 (35);

In exemplary embodiments, the supporting pipe system of chassis (3, 8, 11) is perforated at their base positioning on perforated adapter system of the first system FIG. 3, FIG. 4, being fixed by means detachable locking system FIG. 20 (36,36*a*), and said perforated adapters are welded to the top of the front bumper FIG. 4 and of lateral slats system FIG. 3 being fixed to each side of floor of the scooter and the luggage rack FIG. 5;

In exemplary embodiments, the roof the chassis of the cabin (25) and extension of roof pipe (26) of the pipe system are arched and identical on each side; and said roof is formed of pipes of various piping portions comprising the system of supporter pipes of the system of sliding doors (29) being suspended by detachable straps, said pipes having an angle at their ends being welded pipes under the roof pipe (25) and following the arc of the roof of said pipes. In exemplary embodiments, the connector pipe system (28, 28*a*) is welded to each outer side of the roof pipe, said welded pipes being aligned above door pipe supporters, said curved form of the connector pipe system (28, 28*a*) being oriented toward each side of floor to supporting pipe system (8, 11) of the roof being fixed by means junction system FIG. 19 (35) to the roof of the cabin. The front ends (30) of the roof of the chassis (25) are fixed to the front (3) pipes, and the rear ends (31) of the pipes of the extension (26) are fixed by means of junction system FIG. 19 (35). The rear pipes supporting of roof chassis FIG. 5 (21) of the first system of element and FIG. 7 (45, 45*a*) of the second system of element being fixed to scooter, and in that said ends (31) extension of rear roof pipes (26) having a flag holder pipes-welded (27) at their end.

SHEET 3: In exemplary embodiments, the said first system of elements is selected from the two consisting systems of elements to be fixed to scooter being comprised of: FIG. 3, FIG. 4, FIG. 5, in that said first system of elements being detachable by locking system from the supporting pipe system of the roof chassis of cabin.

FIG. 3: In exemplary embodiments, the system of bolts is fixed on each side of the floor of the scooter, and the perforated lateral identical slats system is composed of: welded perforated adapters (10) at the end of each side of lateral slats (9) being positioned on the outer edge of the floor; said the perforated lateral slats (9) and perforated slats positioned inside (9*a*), of the perforated edge of the scooter floor being fixed by the said system of bolt to scooter. The said welded perforated adapters (10) of the outer side of lateral slats (9) are fixed by means of detachable locking system FIG. 20 (36,36*a*) to supporting system of lateral pipes of the roof of chassis; in that said supporting lateral pipes FIG. 2 (8, 11) of the roof chassis system linked to the ending of the welded curve connector FIG. 2 (28, 28*a*) being fixed by junction system FIG. 19 (35) of each lateral side of the roof pipe system of chassis FIG. 2. (25).

FIG. 4: In exemplary embodiments, the bumper system (1) is composed of pipes forming a rectangle, the perforated adapters (2) being welded on the end of each side to the top of said rectangle, and a perforated plate (1*a*) is welded in the middle of the bottom to the lower portion of said rectangle bumper to be fixed under the scooter; in that said perforated adapters (2) of the bumper being fixed by means of detachable locking system FIG. 20 (36,36*a*) to the system of front supporting pipes FIG. 2 (3) of the roof their base being perforated; and in that system of supporting front pipes of the roof chassis being fixed by means of junction system FIG. 19 (35) to the ending front FIG. 2 (30) of system of the roof pipe FIG. 2 (25).

FIG. 5: In exemplary embodiments, the luggage rack system is mounted under the seat, said luggage rack being composed of structural pipes base being formed of a rectangle (22). Said rectangular base has vertical welded structural pipes (21) on each narrow side of luggage rack, said vertical pipes having welded perforated adapter (20) at the top, said luggage rack vertical pipes form the lower part of the rear chassis of cabin. The said vertical pipes have a welded perforated adapter (20) at the top being fixed by means of detachable locking system FIG. 20 (36,36a) to the ending perforated FIG. 2 (31) extensions of the roof pipes, in that said extensions of the roof pipes FIG. 2 (26) forming the upper rear chassis; the system of luggage rack to the middle of longer base sides of the rectangle has a welded exceeding structural pipe (23) perforated at the end, said exceeding pipe being fixed by means of detachable locking system FIG. 20 (36,36a) to the existing structural perforated pipe under scooter seat. Said top of lower rear system supporting pipes (21) has a welded adapter (20) linked to the ending of the upper rear system FIG. 2 (31) of roof pipes system FIG. 2 (26) fixed by means of detachable locking system FIG. 20 (36,36a).

SHEET 4: In exemplary embodiments, the second system of distinct elements is fixed to scooter, and replaces the first system of distinct elements being fixed to the scooter; said second system of distinct elements being comprised of: FIG. 6, FIG. 7, FIG. 8, FIG. 9, FIG. 10.

Figures 6, 7, 8, 9, 10:
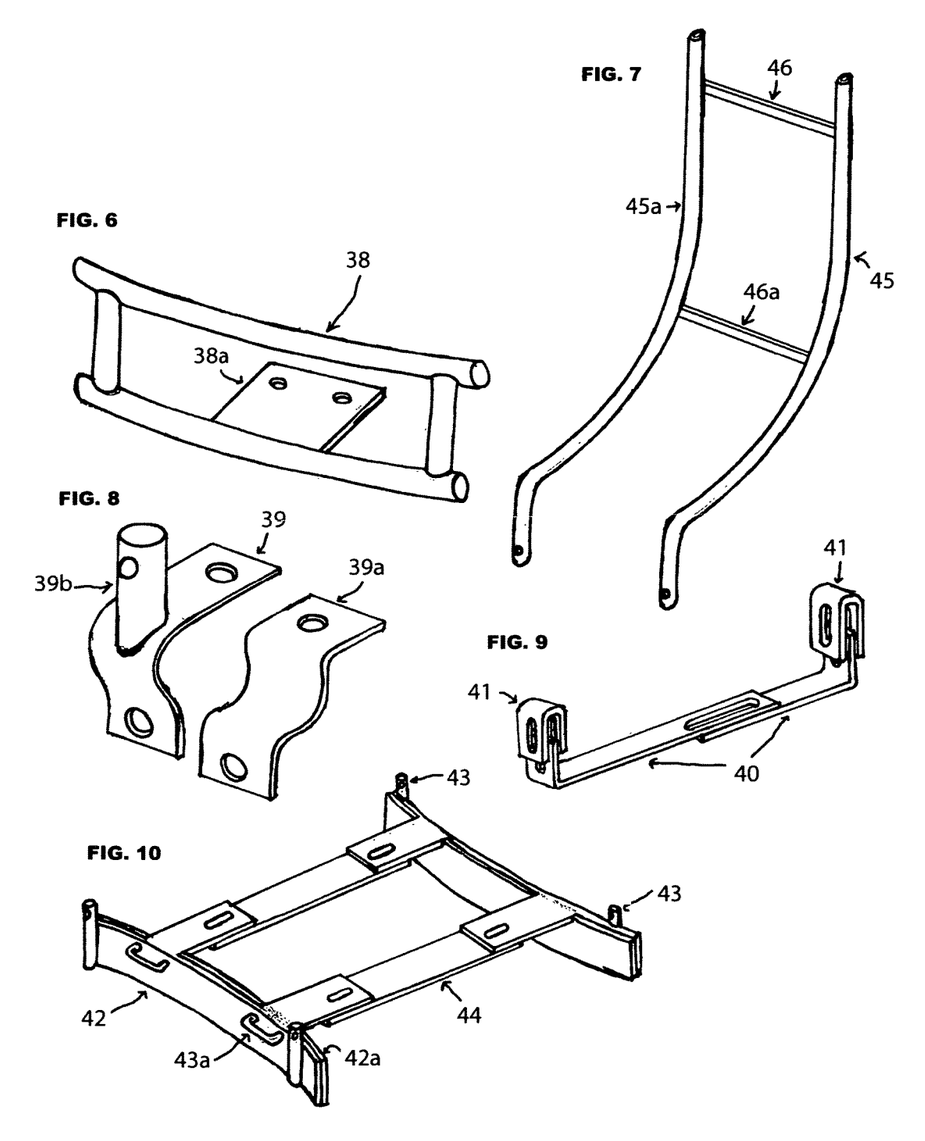
FIG. 6: The drawings represent all component references of front bumper to be permanently fixed under scooter.
FIG. 7: The drawings represent all component references of the lower part of rear pipe chassis of cabin system giving the opportunity to turn the seat.
FIG. 8: The drawings represent all component references of the padded collar system composed of two half circles with perforated adapters being welded to the upper part of the collar.
FIG. 9: The drawings represent all component references of the transversal slat system positioned under the floor having at each end a perforated angle overlapping on two sides of scooter floor, said under slat comprising two sections perforated at their ends, the perforated angle of transversal slat under the floor. Said slat includes a small inverted U shape pieces.
FIG. 10: The drawings represent all—component references of the system of padded lateral narrow slats placed on the edge of each side of the floor of scooter with perforated adapter and the welded half rings on the said lateral narrow slats with the system of padded transversal narrow slats placed on the scooter.

FIG. 6: In exemplary embodiments, the system of bumper (38) is composed of pipes forming a rectangle, a perforated plate (38a) being welded in the middle of the bottom to the lower portion of said rectangle bumper may be locked under the front and the back of the scooter.

FIG. 7: In exemplary embodiments, the scooter's seat can be turned. That system of two supporting lower rear pipes (45,45a) forming the lower rear of the chassis is solidified by transversal slats (46,46a) by means of detachable locking system FIG. 20 (36,36a); and in that said system lower rear pipes of the chassis are linked to ending FIG. 2 (31) to the upper rear portion FIG. 2 (26) of the chassis being fixed by means of junction system FIG. 19 (35); and that said upper rear portion is formed by the extension of the roof pipe system of FIG. 2 (25); and that said supporting rear pipes system forms the lower rear portion of the chassis of the cabin; and that said perforated base of the lower rear pipes is positioned, on the perforated adapter FIG. 8 (39b) being welded to the upper part FIG. 8 (39) and under part FIG. 8 (39a) of padded collar system being fixed to the upper part of bumper FIG. 6 (38); is that perforated base of the lower rear pipes (45,45a) is position on perforated adapter FIG. 8 (39b) and is fixed by means of the detachable locking system FIG. 20 (36,36a).

FIG. 8: In exemplary embodiments, the said system of padded collars is composed of two half circles, upper part (39) and under part (39a) having small outer perforated part exceeding, said system of collars being secured by means of system of bolts to the upper part of the front bumper and upper part of rear bumper FIG. 6 (38); said rectangular bumper being formed of a system of pipes, a small perforated plate FIG. 6 (38a) being welded to the center of the base portion of the rectangular bottom of said bumper may be locked under the scooter. Said system of padded collars may be locked to the existing bumper of the user's scooter; in that said perforator adaptor welded padded collars being fixed on front bumper FIG. 6 (38) and back bumper FIG. 6 (38) of scooter, being fixed by locking system FIG. 20 (36,36a) to the system of supporting pipes of the front roof FIG. 2 (3) and back roof FIG. 7 (45,45a).

FIG. 9: In exemplary embodiments, the transversal slat is positioned under the floor having at each end a perforated angle over lapping on two sides of scooter floor (40), in that said under slat comprising two sections perforated at their ends being fixed by system of bolts, in this way the different size of scooter floor can be adjusted.

There is a perforated angle of the transversal slat under the floor (40), and said slat includes a small inverted U shape piece (41) that allows adjustment to thickness of different scooters floors by sliding up and down; and said inverted U (41) is inserted into the welded half rings FIG. 10 (43a) on the lateral side slats FIG. 10 (42) being fixed on the edge of the floor on either side of scooter; to be finally being fixed by system of bolts which allows to adjust to the thickness of the floor; and the transversals slats (40) are placed under floor being fixed by means of said bolts system in front and rear of floor scooter.

FIG. 10: In exemplary embodiments, the system of bolts consists of a nut and bolt blocking the elements fixed to scooter comprising of: system of padded lateral narrow slats (42) placed on the edge of each side of the floor; and the system of padded transversal narrow slats (44) is placed on the scooter floor and system of transversal narrow slats FIG. 9 (40) is placed under scooter floor; and the said transversals slats placed on floor and the transversals slats placed under floor being fixed by means of said bolts system in front and rear of floor scooter.

The system of padded of lateral narrow slats (42, 42a) is placed on the edge of each side of the floor of scooter being composed: at the ends of said system of padded lateral narrow slats (42a) at the ends of the upper edge (42) of said slat an angle being form by welded of small narrow slats perforated at their ends; being fixed by system of bolds at perforated ends of narrow padded transversal slats system (44) being placed on the floor of scooter, in this way the different size of scooter floor can be adjusted.

The system of narrow padded lateral slat (42) is placed on the edge of each side of the floor of scooter being comprised of: system of two perforated adapters (43) being welded to the ends of the upper side of said system padded lateral narrow slats (42).

The system of two perforated adapters (43) is inserted in supporting pipe system FIG. 7 (45,45a) of the roof of chassis attached by means of detachable locking system FIG. 20 (36,36a). The system of narrow padded lateral slat (42a) is placed on the edge of each side of the floor of scooter; in that said system of narrow padded lateral slat (42) being welded half rings (43a); and an inverted U of FIG. 9 (41) is inserted into the welded half ring (43a) on the lateral side slats (42) being fixed by system of bolts which allows to adjust to the thickness of the floor.

IN THAT CABIN COVERED BY: FIG. 11, FIG. 12, FIG. 13, FIG. 14, FIG. 15, FIG. 16, FIG. 17, FIG. 18;

In exemplary embodiments, the cabin is covered with a system of individual detachable vinyl flexible and transparent panels of 20 gauge UV, FR, CC, vinyl panels being fixed to the fastening system consisting of different sets of fasteners, said attachment system being selected from the group consisting of the system of snaps.

Figure 11:
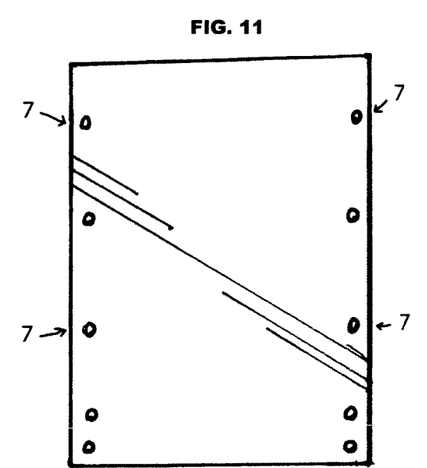
FIG. 11: The drawings represent all component references of the lower portion of the front cabin of transparent and flexible vinyl panels having series of snaps.

FIG. 11: In exemplary embodiments, the said vinyl panel of cabin is individually attached, said panel partially and completely detachable: said vinyl panel forming lower portion of the front of the cabin being fixed by a series of female snaps (7) on the series of male snaps FIG. 15 (13a) fixed on lateral left side of the cabin of the vinyl panel, said vinyl panel being already fixed around the front supporting pipes FIG. 2 (3) of chassis.

Figure 12:
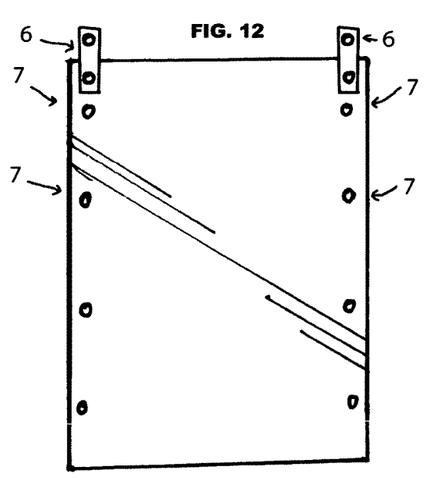
FIG. 12: The drawings represent all component references of the upper portion of the front cabin of transparent and flexible vinyl panels having series of snaps and the upper edge having straps with snaps.

FIG. 12: In exemplary embodiments, the upper panel of said vinyl front part of the cabin has an upper portion, said upper portion having straps with snaps (6) at their end being attached or detached from the inside of either side of vinyl panels of cabin thereby leaving an opening, and said opening allows for better vision in case of heavy rain and snow while leaving sticky rain and snow slide outward; and the upper panel of said vinyl front part of the cabin being fixed by a series of female snaps (7) on the series of male snaps FIG.

Figure 15:
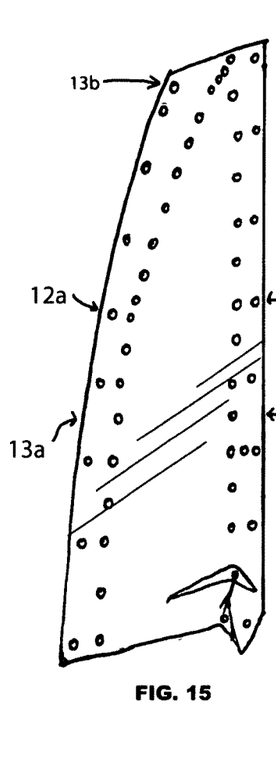
FIG. 15: The drawings represent all component references of the left lateral side of the front of a cabin of transparent and flexible vinyl panel with series of female snaps.

15 (13a) fixed on lateral left side of the cabin of the vinyl panel, said vinyl panel being already fixed around the front supporting pipes FIG. 2 (3) of chassis.

Figure 13:
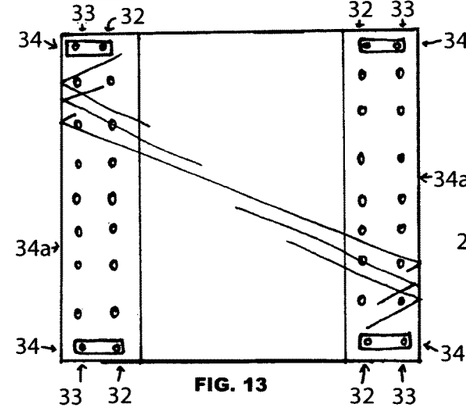
FIG. 13: The drawings represent all component references of the roof panel of cabin of transparent and flexible vinyl panel having two series of snaps on each side and having reflecting straps on each side of front and back side of the roof panels of the cabin.

FIG. 13: In exemplary embodiments, the detachable transparent and flexible vinyl panel roof system includes a panel being secured to the pipes on either side of the roof chassis by means of the system of series of dual function fasteners; said fastening system being selected from the group consisting of a system of snaps.

In exemplary embodiments, the first function comprises of: the first row (33) of detachable transparent and flexible vinyl panel of roof inwardly folded being attached or detached by a series of snaps, said snaps series leaving a section of vinyl panel inwardly folded forming the exceeding vinyl panel outward of the roof of the cabin. In the second function inwardly folded vinyl panel of roof being attached or detached, by the second row of snaps (32); series of snaps keeping the roof pipe of chassis FIG. 2 (25) trapped inside of inwardly folded vinyl panel roof: said detachable vinyl panel roof can be used as a canopy by detaching all vinyl panels from the supporting pipe of roof, a system of reflector straps (34) being fixed in front and rear of each side of said vinyl panel roof, The said sunscreen/heat shield FIG. 21 (37) sliding under (34a) of the detachable roof panel being retained by trapped pipes of the roof system FIG. 2 (25) of the cabin chassis.

Figure 14:
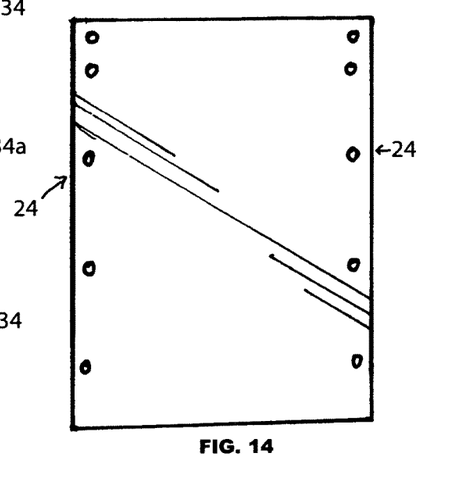
FIG. 14: The drawings represent all component references of the back of a cabin of transparent and flexible vinyl panels having series of snaps.

FIG. 14: In exemplary embodiments, said vinyl panel of cabin is individually attached, and said panel is partially and completely detachable: said vinyl panel forming the rear part of the cabin being fixed by a series of female snaps (24) on the series of male snaps.

Figure 18:
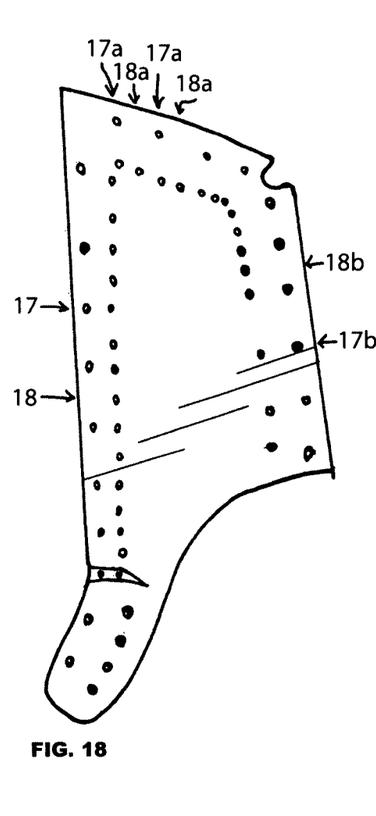
FIG. 18: The drawings represent all component references of the right lateral side of rear cabin of transparent and flexible vinyl panel with series of female snaps.

FIG. 18 (18a,18b) shows a fixed on lateral right-side of the cabin of the vinyl panel, said vinyl panel being already fixed around the rear supporting pipes of the first system of elements FIG. 5 (21), of the second system of elements FIG. 7 (45, 45a) being fixed to the scooter by series of fixed male snaps.

FIG. 15: In exemplary embodiments, the lateral left side of vinyl panel of cabin is fixed by series snaps (12a) around the front FIG. 2 (3), and fixed by series of male snaps (12) and around the left lateral side FIG. 2 (8) supporting pipe of the roof chassis; In that lateral left side of vinyl panel having series of male snaps (13a) being fixed to series of female snaps of front vinyl panel FIG. 11, FIG. 12; the male snaps of (13b) being fixed to strap FIG. 12 (6) of the upper front vinyl panel; and said vinyl panel of lateral left side of cabin being fixed by series of snaps (12) around the left lateral side FIG. 2 (11) supporting pipes of the roof chassis; and said vinyl panel series of male snaps (13) being fixed to the series female snaps FIG. 16 (14) of door vinyl panel.

Figure 16:
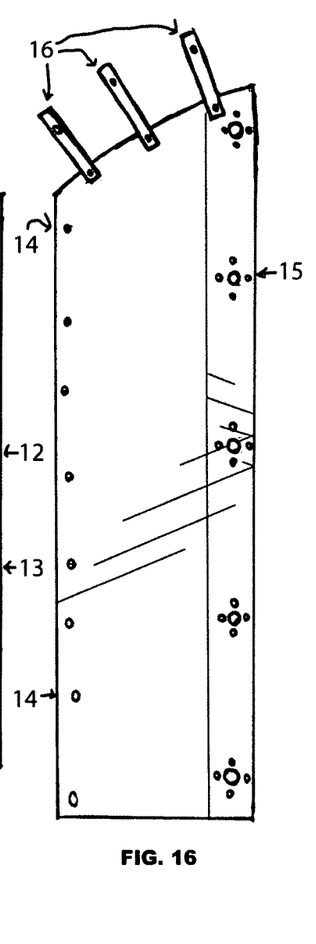
FIG. 16: The drawings represent all component references of the one lateral of the left side of the sliding door system of the cabin of transparent and flexible vinyl panel with series of magnetic closure.

FIG. 16: In exemplary embodiments, the left lateral vinyl panel sliding door system is composed of series of female snaps (14) being attached on the series of male snaps FIG. 15 (13) on the vinyl panel fixed around the lateral supporting pipe FIG. 2 (8) of the roof; the strips with snaps (16) of said sliding door being detachable from supporter pipe FIG. 2 (29) of the sliding doors system, said sliding doors opening into two parts being closed through the system of series of magnetic closures FIG. 22 (15); the magnetic series system closures, said closures being composed: by part of vinyl panel door inwardly folding, said series system closures of being composed of four female snaps keeping the magnets trapped inside of folding part.

Figure 17:
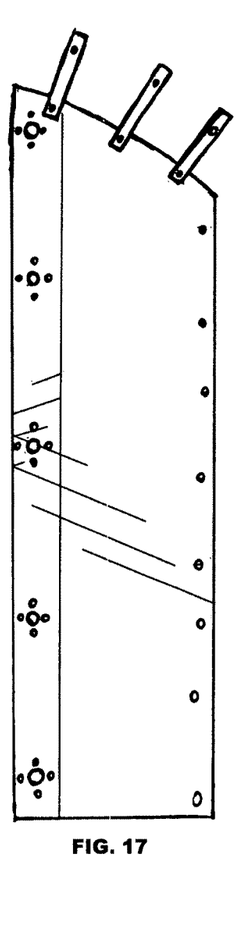
FIG. 17: The drawings represent all component references of the one lateral of the right side of sliding door system of cabin of transparent and flexible vinyl panel with series of magnetic closure.

FIG. 17: In exemplary embodiments, the right lateral vinyl panel sliding door system is composed of a series of female snaps (14) being attached on the series of male snaps FIG. 18 (18) on the vinyl panel fixed around supporting pipe FIG. 2 (11) of the roof; the strips with snaps (16) of said sliding door being detachable from supporter pipe FIG. 2 (29) of the sliding doors system, said sliding doors opening into two parts being closed through the system of series of magnetic closures FIG. 22 (15); and the magnetic system series of closures, said closures being composed: by part of vinyl panel door inwardly folding said closure system of series being composed of four female snaps keeping the magnets trapped inside of folding part.

FIG. 18: In exemplary embodiments, the vinyl panels of lateral right side of cabin are fixed by series of snaps (17) around the right lateral side FIG. 2 (11) supporting pipe of the roof chassis, and said vinyl panel series of male snaps (18) being fixed to female series of snaps FIG. 17 (14) of door vinyl panel; and said vinyl panel being fixed by series of snaps (17a) around of FIG. 2 (26) being extension of roof pipes system.

In exemplary embodiments, the said vinyl panel of lateral right side of (17b) is fixed around the rear of supporting pipe of the roof chassis of the first system of elements FIG. 5 (21) being fixed to scooter; and said vinyl panel series of male snaps (18) being fixed to the female snaps FIG. 14 (24) of the rear vinyl panel.

In exemplary embodiments, the said vinyl panel of lateral right side (17b) is fixed around the rear supporting pipe of the roof chassis of the second system of elements FIG. 7 (45,45a) being fixed to scooter; said vinyl panel series of male snaps (18b) being fixed to the female snaps FIG. 14 (24) of the rear vinyl panel.

Figure 19:
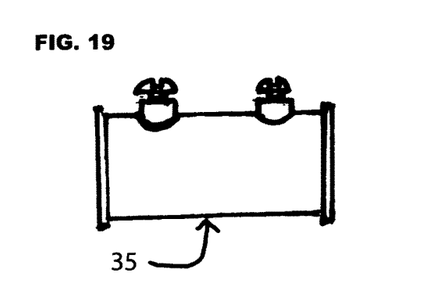
FIG. 19: The drawings represent all component references of junction system being composed of a ring and the screws.

FIG. 19: In exemplary embodiments, the junction system (35) is composed of a ring and the screws.

FIG. 20: In exemplary embodiments, the said locking system is composed of a rod shoulder (36) and a clamp (36a).

Figure 21:
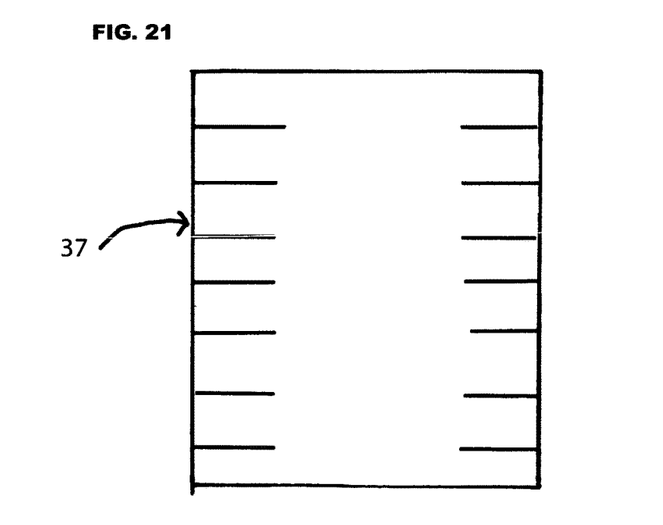
FIG. 21: The drawings represent all component references of the sunscreen/shield system comprised of bubble aluminum foil.

FIG. 21: In exemplary embodiments, the detachable system sunscreen/heat shield (37) full length summer and winter half-length sliding, in the front part of the panel to prevent sun blindness of the user and enabling the sun to penetrate; and said sunscreen/heat shield sliding under the detachable roof panel is retained by trapped pipes of the roof system of the cabin chassis, said sunscreen/heat shield system being comprising of bubble aluminum foil.

Figure 22:
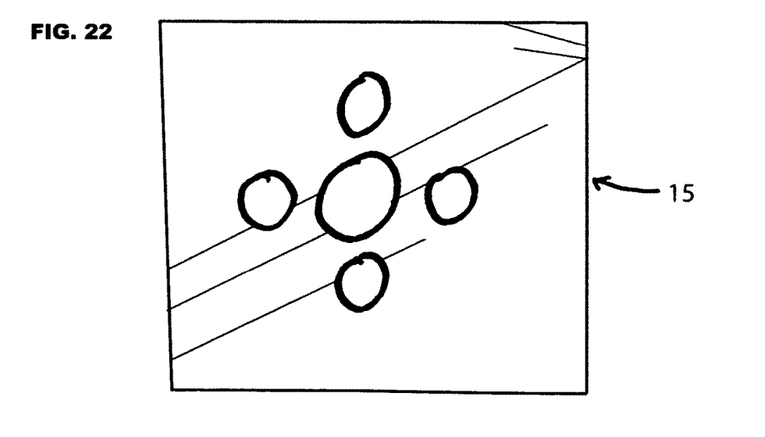
FIG. 22: The drawings represent all component references of a magnetic system door closure.

FIG. 22: In exemplary embodiments, the magnetic system (15) series of closures are composed: by part of vinyl panel door inwardly folding said closure system of series being composed of four female snaps keeping the magnet trapped inside of folding part.

The claim of the invention in which an exclusive property right or privilege is claimed:

1. A cabin for use with a scooter, the cabin comprising:
    a frame assembly comprised of a plurality of chassis pipes and one or more panels attached to the chassis pipes including a panel forming a cabin roof and a panel forming a door of the cabin, each chassis pipe having a base portion;
    the plurality of chassis pipes including at least one curved roof pipe, at least one curved front pipe coupled to and supporting the roof pipe, and at least one transversal slat coupled to the curved roof pipe;
    the plurality of chassis pipes further including at least one vertical supporting pipe coupled to the roof pipe and at least one lateral slat coupled to the vertical pipe;
    the plurality of chassis pipes further including at least one supported door pipe under the at least one curved roof pipe; and
    a junction system coupling the at least one vertical supporting pipe to the roof pipe;

wherein each chassis pipe has a perforation at or near its base portion and the perforation is received by a perforated adapter;

wherein the panels are detachable to convert the cabin roof to a canopy; and wherein two panels having straps are hung up around the supported door pipes, the panels being slideable.

2. The cabin of claim 1 further comprising a bumper coupled to the at least one front pipe.

3. The cabin of claim 2 wherein the bumper is coupled to the front pipe by at least one perforated adapter receiving the perforation of the front pipe.

4. The cabin of claim 1 further comprising a luggage rack coupled to a back part of the cabin.

5. The cabin of claim 4 wherein the luggage rack is comprised of an assembly of structural pipes.

6. The cabin of claim 1 wherein the at least one roof pipe has a perforation, the at least one vertical support pipe has a perforation, and the at least one lateral slat has a perforation and further comprising:

a detachable locking system securing the at least one roof pipe and the at least one vertical support pipe to the at least one lateral slat.

7. The cabin of claim 1 wherein the panels are made of a flexible transparent material.

8. The cabin of claim 1 wherein each roof pipe has two short turn down side pipes fixed at an outside of each side of the roof pipes and supported door pipes under each roof pipe; and wherein each side of each roof pipe has two short turn down side support pipes fixed at the outside of each roof pipe and an adapter is coupled to each side of the support pipes, each side support pipe having a curve followed by an angle at or near its base.

9. The cabin of claim 8 wherein the panel forming the roof of the cabin has a fastening system comprising one or more of snaps, zippers, or Velcro;

wherein a first row of snaps is fixed to create an expand outside the panel from the roof pipes and a second row of snaps squeezes the roof pipes between the first row; and wherein a roof panel has reflective strips on a front and back portion of a roof of the cabin.

10. The cabin of claim 9 wherein an upper part of a front panel is detachable by detaching one or more snaps and attaching the straps to an inside surface of each front side of the front panel, thereby creating an open windshield and maintaining rain flow outside the cabin.

11. The cabin of claim 1 further comprising a magnet system for closing the door of the cabin;

wherein two panels of each door are kept open by the magnet system while pouching each panel to each side of the at least one vertical supporting pipe.

12. The cabin of claim 1 wherein the one or more panels have a fastening system for attaching the panels to the chassis pipes, the fastening system comprising one or more of snaps, zippers, or velcro, the fastening system being designed to be used by people with reduced mobility with various abilities.

13. The cabin of claim 6 wherein the locking system is comprised of a rod shoulder and a clamp.

14. The cabin of claim 1 further comprising a heat shield being disposed under at least one panel.

15. A frame assembly comprising:

a plurality of chassis pipes and one or more panels attached to the chassis pipes, each chassis pipe having a base portion;

the plurality of chassis pipes including two curved roof pipes, each roof pipe having a front end and a rear end;

the plurality of chassis pipes further including two right lateral support pipes, two left lateral support pipes, and two front support pipes, each front support pipe coupled to the front end of each roof pipe, the two right lateral support pipes and the two left lateral support pipes each being coupled to at least one lateral slat fixed inside and at least one lateral slat fixed outside, the lateral slats having adapters, the lateral slats forming edges of a floor of the frame assembly;

a locking system coupling the two front support pipes and the two rear support pipes to the roof pipe via adapters;

a turnable seat supported by the two rear support pipes;

wherein each chassis pipe has a perforation at or near its base portion and the perforation is received by a perforated adapter; and wherein the panels are detachable.

16. The assembly of claim 15 further comprising at least one perforated adapter receiving the perforation of at least one pipe.

17. The assembly of claim 16 further comprising at least one padded collar, wherein the at least one perforated adapter is fixedly attached to the padded collar, the padded collars being secured to a front and back bumper by bolts.

18. The assembly of claim 16 further comprising a front bumper coupled to the two front support pipes, the front bumper being secured to an adapter by the locking system; and a rear bumper coupled to the two rear support pipes, the rear bumper being secured to an adapter by the locking system.

19. The assembly of claim 16 wherein the floor further comprises:

adjustable narrow padded slats placed under a front and back floor, the slats linking to two half rings of padded slat located at each side of an edge of the floor;

wherein each side of each padded slat has two angles coupled to the adjustable narrow padded slats placed on the front and on the back floor being fixed by bolts;

wherein each end side of each padded slat has two adapters;

the adapter of the each end of side padded slat placed on each edge of the front floor receiving the perforated front side supported pipe of the roof, being fixed by locking system; and the adapter of the each end of side padded slat placed on each edge of the back floor receiving the perforated back side supported pipe of the roof, being fixed by locking system.

* * * * *